(12) United States Patent
Littlefield et al.

(10) Patent No.: US 9,239,930 B2
(45) Date of Patent: Jan. 19, 2016

(54) SYSTEM AND METHOD FOR ASSIGNING PERMISSIONS TO ACCESS DATA AND PERFORM ACTIONS IN A COMPUTER SYSTEM

(75) Inventors: Paul Littlefield, Menlo Park, CA (US);
Jessica P. Yang, Sunnyvale, CA (US);
Edward E. Yip, Dublin, CA (US); Kim Man Chan, Palo Alto, CA (US);
Edward Lu, San Bruno, CA (US);
Brigitte Wing-Ming Chan, Milpitas, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 137 days.

(21) Appl. No.: 13/049,692

(22) Filed: Mar. 16, 2011

(65) Prior Publication Data
US 2012/0240193 A1   Sep. 20, 2012

(51) Int. Cl.
*G06F 21/00* (2013.01)
*G06F 21/60* (2013.01)

(52) U.S. Cl.
CPC .................................. *G06F 21/604* (2013.01)

(58) Field of Classification Search
CPC .... G06F 21/00; G06F 21/604; G06F 21/6218
USPC ............................................................ 726/4
See application file for complete search history.

(56) References Cited

U.S. PATENT DOCUMENTS

| 7,885,949 B2 * | 2/2011 | Gabbert et al. ............... 707/705 |
| 2002/0174238 A1 * | 11/2002 | Sinn et al. ..................... 709/229 |
| 2003/0216957 A1 * | 11/2003 | Florence et al. ................ 705/11 |
| 2004/0006594 A1 * | 1/2004 | Boyer et al. ................... 709/204 |
| 2005/0138031 A1 * | 6/2005 | Wefers ............................. 707/9 |
| 2011/0213789 A1 * | 9/2011 | Doshi et al. ................... 707/754 |
| 2012/0233666 A1 * | 9/2012 | Gu ................................... 726/4 |

\* cited by examiner

*Primary Examiner* — Syed Zaidi
(74) *Attorney, Agent, or Firm* — Fountainhead Law Group P.C.

(57) ABSTRACT

A method for setting permissions for a group of users of a computer system. The method includes receiving data that defines a role for a first group of users, the role including one or more permissions each defining a permitted activity of the first group of users with respect to data of users in a second group of users, and setting the one or more permissions based on the defined role.

23 Claims, 18 Drawing Sheets

Groups Definition Tool

Group Definition

Type a name for your group. Then choose who you want to include in the group.

Group Name [_____402_____]

Group Membership: 0   [Update]

Choose Group Members: Tip: You can include multiple People Pools in the same group. See examples

- People Pool
  - Pick a category... [v] ~404
  - Add another category

Add another People Pool

Exclude these people from the group:

- People Pool
  - Pick a category... [v] ~406
  - Add another category

Add another People Pool

☐ Lock the group to prevent further changes to criteria and membership

[Done] [Cancel]

FIG. 4

Create Group "Employees in the US"

Group Definition                                              [X]

Type a name for your group. Then choose who you want to include in the group.

Group Name [Employees in the United States]     Group Membership
                                                       0    [Update]

Choose Group Members: Tip: You can include multiple People Pools in the same group. See examples

- People Pool
    [Pick a category... ▽] — 504
    [Pick a category...]
    City
Add  Country
    Department
    Division
▶   Geography
    Hire Date
    Job Code
    Location
    State
Exc Team View
    Time Zone
    Title
Add User
    Username
    ZIP from the group:

further changes to criteria and membership

[Done] [Cancel]

FIG. 5

Settings Permissions for the Role

Home Obj

New Rol
Admin To

1. Name
Role Na
Descript

2. Permi
Specify
Permissi

3. Grant
Select a
records f
records w

Add...

Permission Settings

Specify what permissions users in this role should have.

Mannager Users

- Manage User Security
- Form Template Administration
- Manage Documents
- Manage Competencies and Skills
- Manage Question Library
- Manage Recruiting
- System Properties
- Position Management
- Compensation Administration
- Variable Pay Administration
- Dashboards/Report
- Manage Objectives
- BizX Management
- Management Development
- User Data Model

Manage User Security  t=Target population required

☐ Select all
☐ Human Resources Privileges
☐ Dashboard
　○ All
　○ Other

Performance
　Objective Management
　CEO
　Line Manager
　HR Executive

Ctrl-Click to select multiple

☐ Spotlight View
　○ All
　○ Other

[Done] [Cancel]

FIG. 8A

Settings Permissions for the Role

Home Obj...

New Rol... ports
Admin To... Permission Settings

Specify what permissions users in this role should have.

1. Name
   Role Na:    Manage Users                 Manage Users          t=Target population required
   Descript    Manager User Security            ☐ Select all
               Form Template Administration     ☐ Add New Employee[t]
2. Permi...   Manage Documents                 ☐ Change User Email Notification[t]
   Specify    Manage Competencies and Skills   ☐ Change User Information[t]
   Permissi   Manage Question Library          ☐ Documents Transfer[t]
               Manage Recruiting                ☐ Employee Import[t]
3. Grant      System Properties                ☐ Employee Export[t]
   Select a   Position Management              ☐ Generate Audit Trail[t]
   records f  Compensation Administration      ☐ Import Employee Data[t]
   records w  Variable Pay Administration      ☐ Manage User[t]
               Dashboards/Report
   Add...     Manage Objectives
               BizX Management
               Management Development
               User Data Model

[Done] [Cancel]

FIG. 8B

Settings Permissions for the Role

Specify what permissions users in this role should have.

- Manage Users
- Mannager User Security
- Form Template Administration
- Manage Documents
- Manage Competencies and Skills
- Manage Question Library
- Manage Recruiting
- System Properties
- Position Management
- Compensation Administration
- Variable Pay Administration
- Dashboards/Report
- Manage Objectives
- BizX Management
- Management Development
- User Data Model

Permission Settings

Compensation Administration      t=Target population required

- ☐ Select all
- ☑ Budget Assignment [t]
- ☐ Compensation Aggregate Export [t]
- ☐ Compensation Form Membership [t]
- ☐ Compensation Groups [t]
- ☐ Compensation Rollup [t]
- ☑ Compensation Executive review Permission [t]
  - ☐ Read  ☑ Write
- ☐ Manage Compensation Forms [t]
- ☐ Manage Currency Conversion Rate Tables
- ☐ Manage Families and Groups [t]
- ☐ Manage Job Code and Pay Grade Map
- ☐ Manage Lookup Table
- ☐ Manage Merit Matrices
- ☐ Manage Personal Compensation Statement
- ☐ Manage Salary Pay Matrix
- ☐ Manage Stock Factors Tables
- ☐ Manage Stock Value Tables
- ☐ Personal Compensation Statement Permission
- ☐ Store Compensation Data in Live Profile

[Done] [Cancel]

FIG. 8C

Settings Permissions for the Role

Specify what permissions users in this role should have.

Manage Users
Mannager User Security
Form Template Administration
Manage Documents
Manage Competencies and Skills
Manage Question Library
Manage Recruiting
System Properties
Position Management
Compensation Administration
Variable Pay Administration
Dashboards/Report
Manage Objectives
BizX Management
Management Development
User Data Model

Permission Settings t=Target population required

| User Data Model | Read | Write |
|---|---|---|
| Employee Profile | ☐ | ☐ |
| Business Phone | ☑ | ☑ |
| Department | ☑ | ☑ |
| Division | ☑ | ☑ |
| Email | ☑ | ☐ |
| First Name | ☐ | ☐ |
| Hire Date | ☐ | ☐ |
| Job Code | | |

| | Read | Write |
|---|---|---|
| Background | ☐ | ☐ |
| Awards | ☑ | ☐ |

[Done] [Cancel]

FIG. 8D

Summary of Permission Selections

Home  Objectives  Performance  Compensation  Development  Succession  Careers  Company Info  My Employee File  Reports HR Role
Admin Tools : Manage Permission Roles : HR Role Print preview

1. Name and description
Role Name: [HR Role]
Description: [        ]

2. Permission settings
Specify what permissions users in this role should have.

Permissions...
▽ Permissions not requiring target population
  User Administrations
  • Employee Import
  • Employee Export
  • Change User Information
  • Manage User
  Category 1
  • Employee Import
  • Employee Export
  • Change User Information
  • Manage User

*The permissions you selected are summarized here*

[Save changes] [Cancel]

FIG. 9

Select Groups

Home  Objectives  Performance  Compensation  Development  Succession  Careers  Company Info  My Employee File  Reports HR Role
Admin To Grant this role to....

1. Define whom you want to grant this role permission to.

Assign role to:

Premission Group: [Human resources in Germany] ~1002  Select...

Allow their managers to have the same permission access.
   level(s) up (For example: Direct manager is 1 level up)

2. Specify the target populaton whom the above granted users have permission to access. <u>Why?</u>

Target population:

Premission Group: [Employees in Germany] ~1004  Select...

Add...

Done  Cancel

Grant this role to...

1: Define whom you want to grant this role permission to.

Grant this role to: [Matrix Managers ▽] — 1106

- ⦿ All managers
- ○ Only the Matrix Managers of these groups below:

[None Selected]
  [Select...]

- ☐ Allow their manager to have the same permission access.
  [1 ▽] level(s) up (for example: Direct manager is 1 level up) up to the above granted users have permission to access. Why 2: Specify the target population:

1122 — ⦿ Granted User's Matrix reports

1124 — ○ Only the Matrix reports in these groups below:

[None Selected] — 1126
[Select...]

☑ Include access to the Reports of the Granted User's Direct Reports:
[1 ▽] level(s) down

| 1 |
| 2 |
| 3 |
| All | the permission access to him/herself.

☐ Exclude Granted User from

[Done] [Cancel]

FIG. 11E

Grant this role to...

1: Define whom you want to grant this role permission to.

Grant this role to:
Permission Group... ▼
None Selected
Select...

☐ Allow their manager to have the same permission access.
[1 ▼] level(s) up (for example: Direct manager is 1 level up)

2: Specify the target population whom the above granted users have permission to access. Why

Target population:
○ Everyone
⦿ Target population of:

☑ Granted User's custom01 ▼ — 1130
   Granted User's custom01
   Granted User's custom02
   Granted User's Department
   Granted User's Division
   Granted User's Location
   Granted User's (Self)

☐

1128

☐ Exclude Granted User from [____] him/herself.

[Done] [Cancel]

FIG. 11F

SYSTEM AND METHOD FOR ASSIGNING PERMISSIONS TO ACCESS DATA AND PERFORM ACTIONS IN A COMPUTER SYSTEM

BACKGROUND

1. Field of the Invention

The present invention relates to the field of computer software and, in particular, to a system and method for assigning permissions to access data and perform actions in a computer system.

2. Description of the Related Art

One commonly-performed task in managing users of a shared computer system, such as employees in a large organization, is setting user permissions. Each user may be provided access, i.e., "permission," to view, edit, or generate certain types of data, or perform certain actions in the system. For example, in a corporate organization, each member of the human resources (HR) department may have access to view the personnel records of the other employees in the corporate organization. However, employees not in the HR department would not have this access. An example of an action would be that each member of the human resources (HR) department may be allowed to reset passwords for employees in the corporate organization. However, employees not in the HR department would not have this access.

Setting permissions for each user in an organization individually can be a very tedious, time-consuming, and error-prone process. For example, if 1000 different users were to be granted permission to view a particular set of files, then each user would need to be individually granted the permission. If the individual users to whom the permission is granted changes, then the change would need to be entered for each affected user. Some conventional techniques allow for an administrator to generate a group of users and assign permissions to the group. In such a case, each member of the group is granted the permission. However, managing group membership can also be tedious, time consuming and error prone. Errors in granting appropriate permissions are common when using such conventional techniques.

Accordingly, there remains a need in the art for a technique that addresses the drawbacks and limitations discussed above.

SUMMARY

Embodiments of the invention provide a method for setting permissions for a group of users of a computer system. The method includes receiving data that defines a role for a first group of users, the role including one or more permissions each defining a permitted activity of the first group of users with respect to data or actions, and setting the one or more permissions based on the defined role.

Advantageously, embodiments of the invention provide administrative efficiency, satisfy complex security control models, and handle security requirements of large enterprises and conglomerates.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a screenshot illustrating a user interface for generating a group of users, according to one embodiment of the invention.

FIG. 5 is a screenshot illustrating a user interface for generating a group of users by selecting a category, according to one embodiment of the invention.

FIGS. 8A-8D are screenshots illustrating user interfaces for setting permission of a role, according to various embodiments of the invention.

FIG. 9 is a screenshot illustrating a user interface summarizing selected permissions of a role, according to one embodiment of the invention.

FIG. 10 is a screenshot illustrating a user interface for associating the first and second groups of users to the role, according to one embodiment of the invention.

FIGS. 11A-11F are screenshots of user interfaces for associating the first and second groups of users to the role, according to various embodiments of the invention.

DETAILED DESCRIPTION OF EXEMPLARY EMBODIMENTS

Embodiments of the invention provide a method for setting permissions for a group of users of a computer system. The method includes receiving data that defines a role for a first group of users, the role including one or more permissions each defining a permitted activity of the first group of users with respect to data or actions. The data or actions can, in some embodiments, be associated with a second group of users.

Hardware Overview

Figure 1:
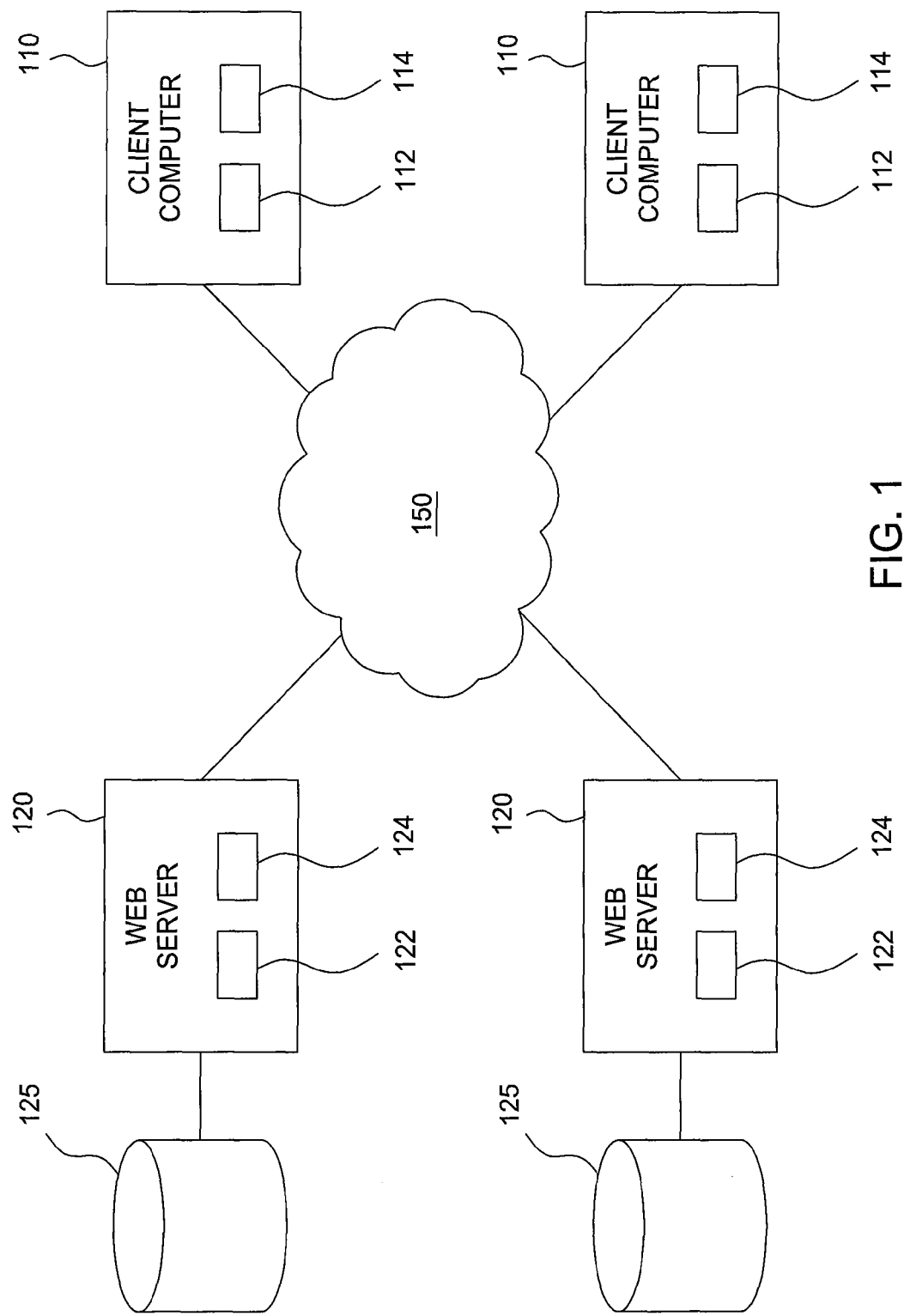
FIG. 1 illustrates a networked computer environment in which embodiments of the invention may be practiced.

FIG. 1 illustrates a networked computer environment in which embodiments of the invention may be practiced. As shown, the networked computer environment includes a plurality of client computers 110 (only two of which are shown) and a plurality of web servers 120 with associated content storage units 125. The client computers 110 and the web server computers 120 are connected over a computer network 150, e.g., the Internet.

Each client computer 110 includes conventional components of a computing device, e.g., a processor 112, system memory 114, a hard disk drive, input devices such as a mouse and a keyboard, and output devices such as a monitor, among others. Each web server 120 includes a processor 122 and a system memory 124, and manages the contents stored in its respective content storage unit using a relational database software. The web server is programmed to communicate with the client computers 110 and other web servers using the TCP/IP protocol. The client computers 110 are programmed to execute web browser programs and other software applications and access the web pages and/or applications managed by the web servers by specifying a uniform resource locator (URL) for the web server into the browser.

In the embodiments of the present invention described below, users are respectively operating the client computers 110 that are connected to the web servers 120 over the Internet. The web pages that are displayed to a user are transmitted from the web servers 120 to that user's client computer 110 and processed by the web browser program stored in that user's client computer 110 for display through the monitor of that user's client computer 110.

Client computers 110 includes a System 200 may be a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

Assigning Permissions

Embodiments of the invention provide a method for setting permissions for a group of users of a computer system. The method includes receiving data that defines a role for a first group of users, the role including one or more permissions each defining a permitted activity of the first group of users with respect to data or actions. The data or actions can, in some embodiments, be associated with a second group of objects, such as users. In one embodiment, performing actions is an activity-based permission, e.g., "approve job offer." The permission is focused on a business activity, and is not focused on what data is affected by the activity. The permissions can be either data-oriented, meaning that they explicitly define what data fields you may view or edit, or action-oriented, meaning that you may perform some business function, like "approve job offer."

Membership in the first and second groups can be dynamic. Also, many different and configurable roles are available according to various embodiments of the invention.

Some embodiments of the invention provide a software framework for hierarchically organizing individual entities or other objects. For example, the software framework may be configured to hierarchically organize employees at a company. Embodiments of the invention may include a query builder that is configured to apply one or more filters to the hierarchical organization to determine membership of a group or groups used for managing permissions to access information.

In some embodiments, a user, such as an administrator, may update a hierarchically-arranged organizational tree to move individuals in the tree, add individuals to the tree, or remove individuals from the tree. In these embodiments, the software framework may be configured to dynamically update the group memberships relating to elements of the organizational tree in response the update of the hierarchically-arranged organizational tree. In addition, embodiments of the invention provide a technique for creating customized roles when managing permissions to access information.

Advantageously, embodiments of the invention provide significant enhancements to ease administrative burdens when managing permissions to access information associated with individual entities in a shared computer environment.

Figure 2:
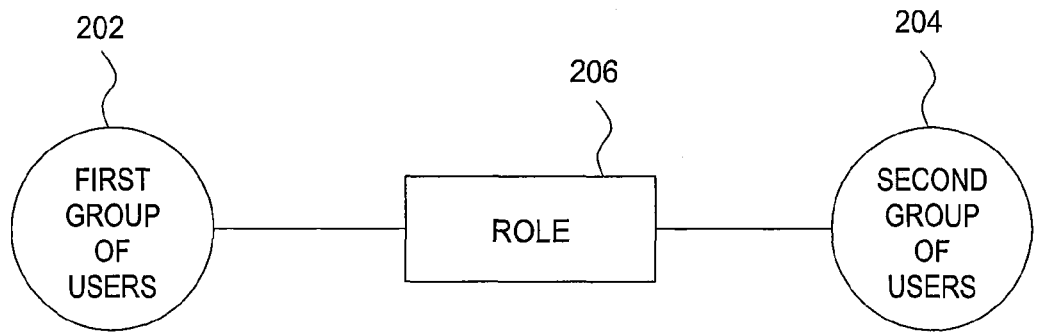
FIG. 2 is a conceptual diagram illustrating associating permissions to access information associated with users in a computer system, according to one embodiment of the invention.

FIG. 2 is a conceptual diagram illustrating associating permissions to access information associated with users in a computer system, according to one embodiment of the invention. A user, such as an administrator, may specify one or more criteria that define a first group of users 202 and a second group of users 204. For each user in the computer system, membership in each of the first or second groups is based on whether the user satisfies the one or more criteria associated with each of the groups. A role 206 includes one or more permissions each defining a permitted activity of the first group of users 202 with respect to data of users in a second group of users 204. According to various embodiments, the permitted activity may include at least one of viewing, editing, or generating the data of the users in the second group of users 204.

In some embodiments, some permissions do not require definition of a second group. An example of this would be the permission to log-in to the system. The first group of users 202 is called the "granted users" group. In this example, the role 206 provides the permission to log-in, and applies to the granted users group. There is no second group of users in this example. Another example is the permission to edit a company dictionary (e.g., used in a spell checking feature). This permission also applies only to the granted users (i.e., the first group). Again, there is not a need for a second group (also referred to herein as the "target users"). Accordingly, the second group of users is included in some embodiments of the invention, but not all.

Figure 3:
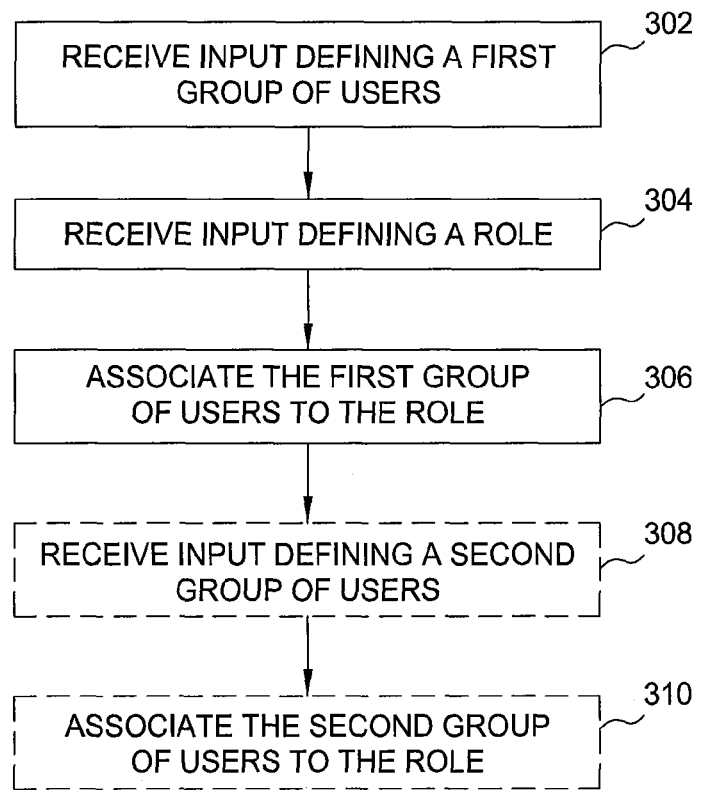
FIG. 3 is a flow diagram of method steps for assigning a role to a first group of users, according to one embodiment of the invention.

FIG. 3 is a flow diagram of method steps for assigning a role to a first group of users, according to one embodiment of the invention. Persons skilled in the art will understand that, even though the method 300 is described in conjunction with the systems of FIGS. 1-2, any system configured to perform the method steps, in any order, is within the scope of embodiments of the invention.

As shown, the method 300 begins at step 302, where a software application receives input that defines a first group of users. The first group of users may be generated based on user selection of group membership criteria. FIG. 4 is a screenshot illustrating a user interface for generating a group of users, according to one embodiment of the invention. As shown, a user can create a "people pool," i.e., a sub-group, of users based on one or more criteria. A group of users can include multiple "people pools." A user, such as an administrator, can assign a group name 402 to the group that is being generated. In some embodiments, the user can begin by selecting a category 404 of users for the group. FIG. 5 is a screenshot illustrating a user interface for generating a group of users by selecting a category 504, according to one embodiment of the invention. As shown, the user can select a category 504, such as city, country, department, division, geography, hire date, job code, location, state, team view, time zone, title, user, username, ZIP code, or any other technically feasible category. In some embodiments, a "team view" category may be associated with receiving user input that selects a particular user in an organizational hierarchy or other team-based relationship. Then, the software application may add, to the group, any other users that are one, two, or any other number of levels below or subordinate to the selected user in the hierarchy.

Figure 6:
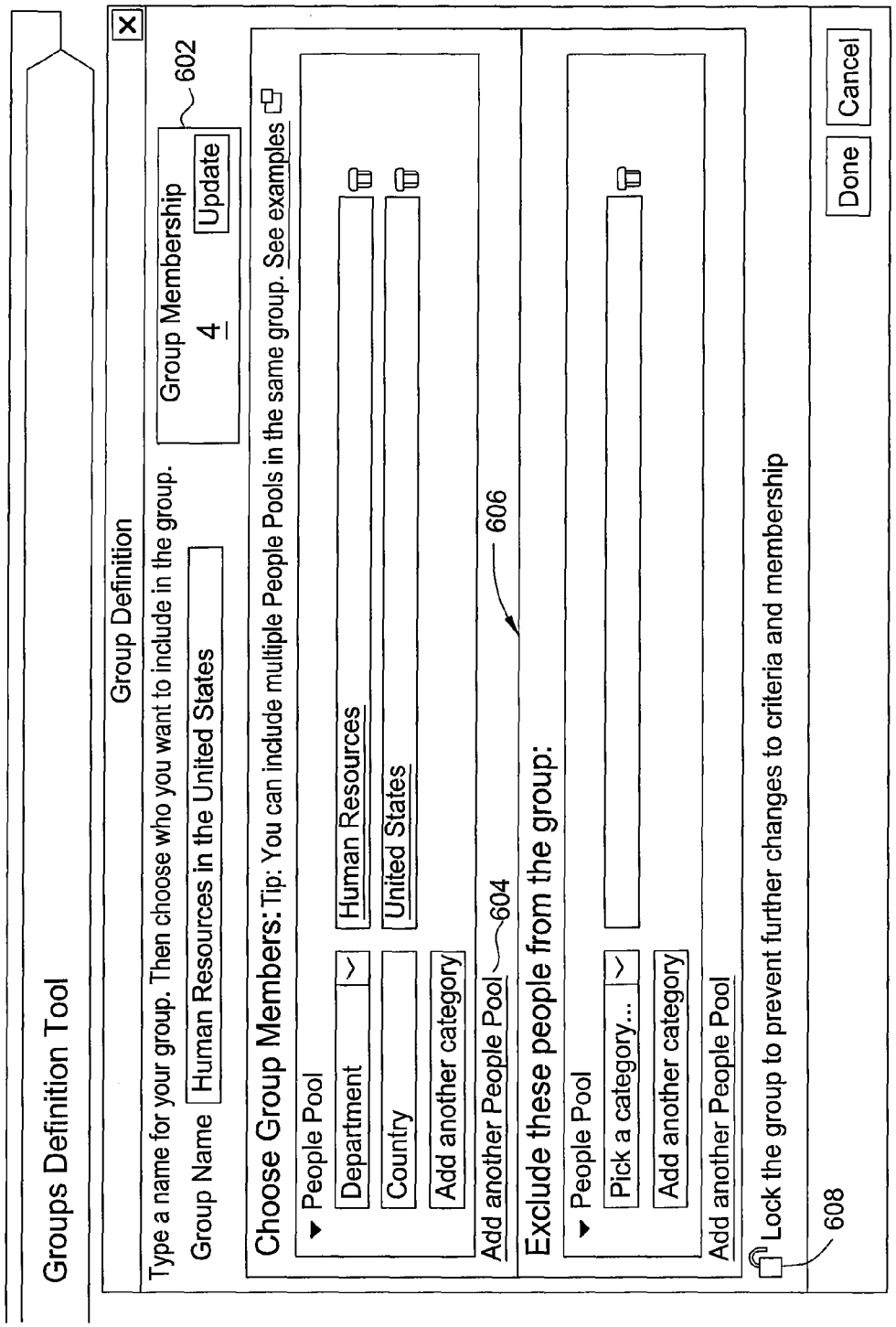
FIG. 6 is a screenshot illustrating a user interface for generating a group of users based on two criteria, according to one embodiment of the invention.

FIG. 6 is a screenshot illustrating a user interface for generating a group of users based on two criteria, according to one embodiment of the invention. As shown, the user has selected the category "department" with a value of "human resources" and another category "country" with a value of United States. Any user in the organization that is in the human resources department and works in the United States is automatically added as member to the group. A group membership count 602 may be automatically updated with the number of users in the group. As shown in the example in FIG. 6, there are four (4) users in the human resources in the United States in this organization.

Accordingly, in the example shown in FIG. 6, the users in the human resources in the United States define a "people pool," or sub-group. Another people pool or sub-group can be created and added to the group of users by selecting an "add another people pool" link 604. For example, the user can create another people pool having membership criteria for users that are in the human resources department in Canada. The members included in either people pool are then added to the group of users. Accordingly, the members of the multiple people pools are combined with a logical OR operation to generate the total listing of users included in the group of users.

In still further embodiments, the user interface may include an interface 606 through which the user can exclude certain users from the group of users by defining one or more other criteria for exclusion. For example, the user can set an exclusion criterion that any users that work in California should be excluded from the group of users. Such an exclusion criterion defines an exclusionary people pool. Similar to the group membership people pools, described above, the user can define multiple exclusionary people pools, each of which can independently exclude particular users from the total listing of users included in the group of users.

Accordingly, using the various tools provided by the user interface, the administrative user can define criteria for membership to the group of users. A software application executed by a processor may examine the criteria and compare the criteria to data associated with the users in the organization to dynamically define the group membership. For example, each user may be associated with various attributes that the software application can compare to the criteria to determine whether a particular user should be included in the group. As described, the group membership may be dynamic. Accordingly, when the data of a particular user is updated, and now satisfies the group membership criteria, then the particular user is automatically added to the group. In some embodiments, a lock feature 608 may be enabled so that the group membership is not dynamic. Accordingly, the group membership is set at the time the group is created, and if another member satisfies the criteria at a later time, then the other user is not added to the group.

Figure 7:
FIG. 7 is a screenshot illustrating a user interface for defining a role, according to one embodiment of the invention.

At step 304, the software application receives input that defines a role. The role includes one or more permissions that each define a permitted activity of the first group of users. FIG. 7 is a screenshot illustrating a user interface for defining a role, according to one embodiment of the invention. As shown, the user interface may include fields for defining a name 702 and a description 704 of the role. The user can select the permissions link 706 to define one or more permissions associated with the role that can be performed by the first group of users.

FIGS. 8A-8D are screenshots illustrating user interfaces for setting permission of a role, according to various embodiments of the invention. According to various embodiments, one or more permissions may be associated with a role. In some embodiments, the permissions can be grouped into categories, such as manage users, manage user security, form template administration, manage documents, manage competencies and skills, manage question library, manage recruiting, system properties, position management, compensation administration, variable pay administration, dashboards/report, manage objectives, business execution management, management development, user data model, or any other technically feasible category. In FIG. 8A, the "manage user security "category is selected, which provides various permissions to be set in the user interface. In FIG. 8B, the "manage users" category is selected, which provides various permissions to be set in the user interface. In FIG. 8C, the "compensation administration" category is selected, which provides various permissions to be set in the user interface. In FIG. 8D, the "user data model" category is selected, which provides various permissions to be set in the user interface. As described herein, the permitted activity associated with a permission may comprise the ability to view, edit, or generate data of the users in the second group of users.

The examples shown in FIGS. 8A-8D are merely exemplary and are not meant to limit the scope of embodiments of the invention. For example, embodiments of the invention are not limited to accessing data about users only. In other embodiments, the permissions can allow the first group of users to view, edit, or generate data that is not associated with users. For example, under the category "System Properties," there can be permissions that allow the first group of users to edit the Company Spell Check Dictionary.

FIG. 9 is a screenshot illustrating a user interface summarizing selected permissions of a role, according to one embodiment of the invention. In the example shown, an "HR Role" role has been created that includes permissions for employee import, employee export, change user information, and manage user. As should be understood by those having ordinary skill in the art, the example shown in FIG. 9 is merely exemplary and many other configurations of roles, with different permissions, are also with in the scope of embodiments of the invention.

Referring back to FIG. 3, at step 306, the software application associates the first group of users to the role. More specifically, the software application receives data that links the role to the first group of users, the role including one or more permissions each defining a permitted activity of the first group of users. The software application then sets the one or more permissions for each user in the first group of users based on the defined role.

In some embodiments, as described above, the role can include permissions for the first group of users to perform with respect to a second group of users. In these embodiments, at step 308, a software application receives input defining a second group of users. As described above with respect to defining the first group of users at step 302, a user, such as an administrator, can utilize the user interface tools described in FIGS. 4-6 to set the membership criteria for a group of users. In some embodiments, the same user interface tools can be used to receive user input that defines the second group of users.

At step 310, the software application associates the second group of users to the role. More specifically, the software application receives data that links the role to the second group of users. The role is now linked to both the first group of users and the second group of users, and includes one or more permissions each defining a permitted activity of the first group of users relative to the second group of users.

In still further embodiments, the "second group of users" can be generalized into other types of objects. For example, instead of "users," embodiments of the invention are associated with "target objects," which can be users or any other property, action, data, or any other technically feasible property. Examples of target objects that are not "users" include jobs, job requisitions, organizations, compensation plans, among others. Similarly, the first group of users can, in some embodiments, be generalized to include a first group of "source objects" that are not "users."

In embodiments where there is no second group of users or target objects, steps 308 and 310 are omitted, indicated by the dotted lines around these steps. In these embodiments, the role is associated with the first group of users or target objects, and no second group of users or target objects is necessary.

FIG. 10 is a screenshot illustrating a user interface for associating the first and second groups of users to the role, according to one embodiment of the invention. In some embodiments, the user may select a grant role link 708 (shown in FIG. 7), which causes the interface shown in FIG. 10 to be displayed. As shown in FIG. 10, the user may select the first group of users (i.e., "granted users") in field 1002 and may select the second group of users (i.e., "target users") in field 1004. The groups of users may have been defined according to steps 302 and 308, respectively, as described above.

FIGS. 11A-11F are screenshots of user interfaces for associating the first and second groups of users to the role, according to various embodiments of the invention.

Figure 11A:
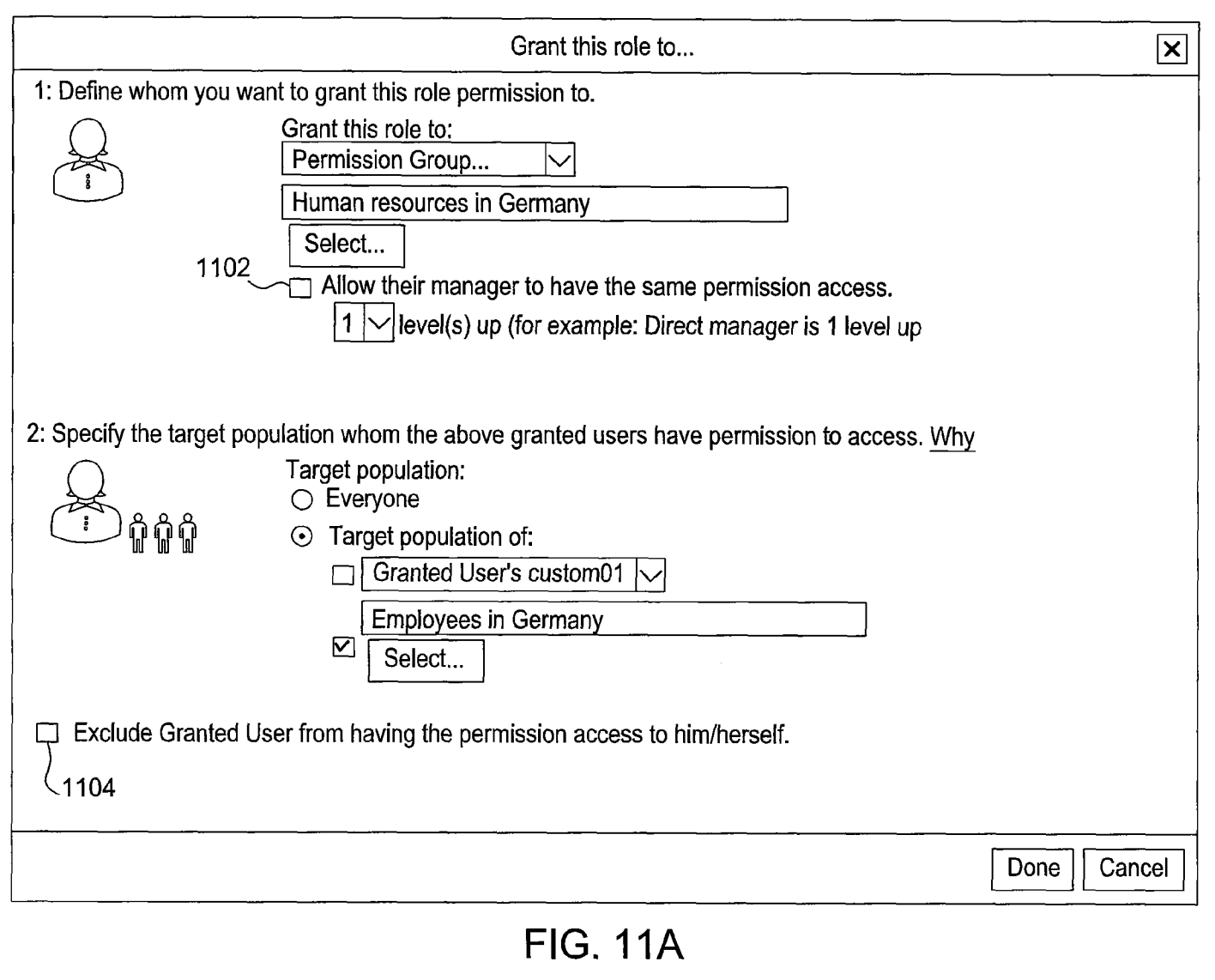

FIG. 11A is a screenshot of a user interface for associating a discrete first group of users and a discrete second group of users to the role, according to one embodiment of the invention. In the example shown, the first group of users comprises "Human Resources in Germany" and the second group of users comprises "Employees in Germany." Some embodiments have the ability to grant all the managers of the users in the first group to also have the same permission access. This ability can be set by checking the checkbox 1102. Another checkbox 1104 can be set to exclude granted users from having the permission access associated with the role to him/herself.

Figure 11B:
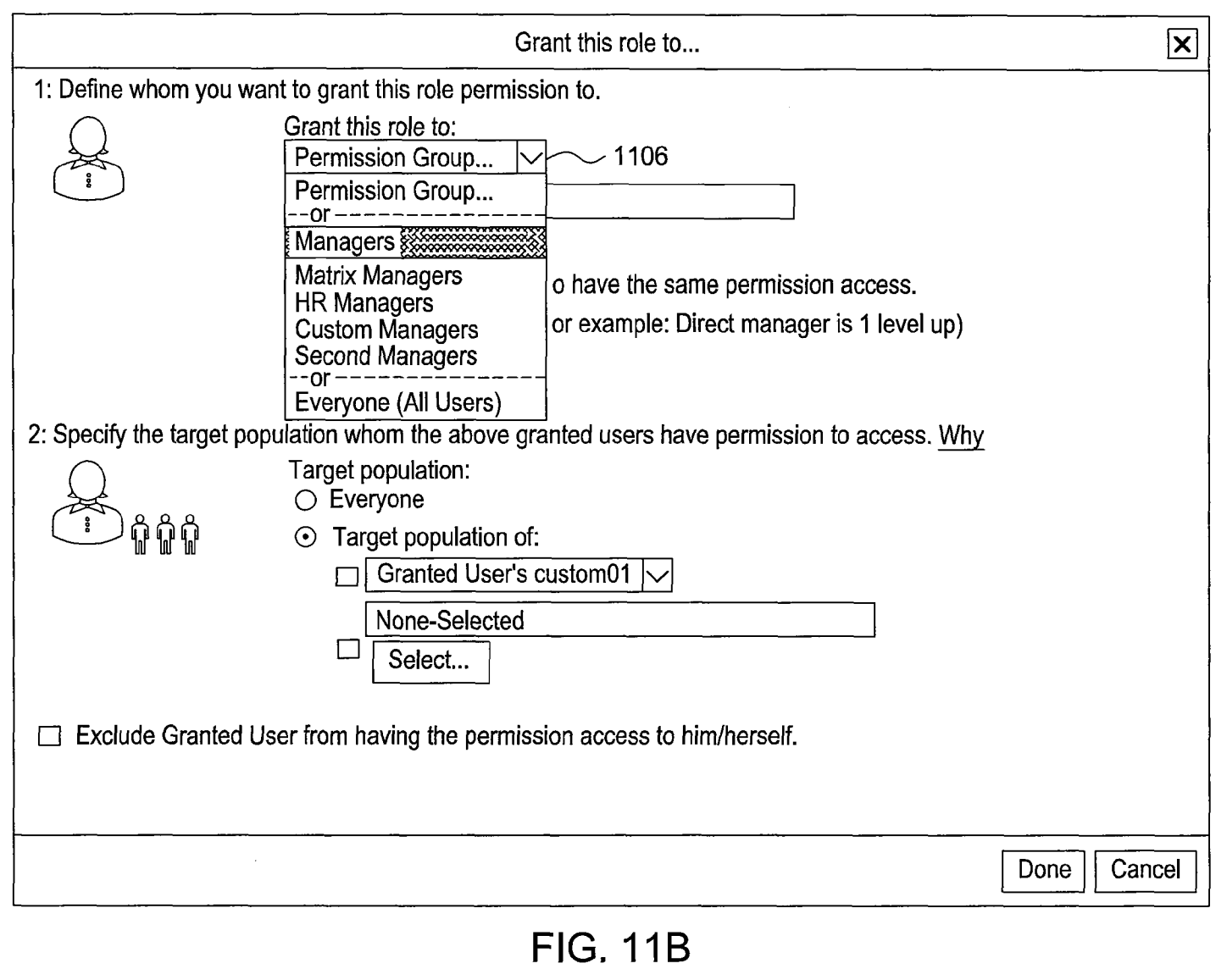

FIG. 11B is a screenshot of a user interface for associating a role to relative groups of users, according to one embodiment of the invention. In some embodiments, the second group of users is qualified by the first group of users. In the example shown in FIG. 11B, a drop-down list 1106 can be associated with setting the first group of users. Examples of options included in the first drop-down list include managers, matrix managers, HR managers, custom managers, or second managers. When one of the options is selected from drop-down list 1106, the second group of users becomes an output of the first group of users. For example, if "Managers" is selected from first drop-down list 1106, the second group of users is "Direct Reports." This allows embodiments to specify that Managers should have the permission to perform the specified role upon their Direct Reports.

Figure 11C:

FIG. 11C is a screenshot of a user interface for associating a role to relative groups of users, according to one embodiment of the invention. As described in reference to FIG. 11B, "Managers" is selected from first drop-down list 1106. As shown in FIG. 11C, the second group of users is automatically quantified as the Direct Reports of the Managers.

In addition, embodiments allow the first and second groups to be further qualified. With respect to the first group of users, embodiment allow the user to specify that the role is granted to "All Managers" (as is shown in FIG. 11C) or to specify that the role is granted only to Managers of groups selected in the input field 1108. For example, a user can input "Employees In North America" in the input field 1108. Then, the definition for the first group of users would be "Managers in North America" since the option 1110 for selecting "Only Managers in of these groups below" is specified. Similarly, embodiments allow the second group of users to be qualified. FIG. 11C shows the example of specifying the option 1112 to select "Granted User's Direct Reports," but in another example, the second group of users can be further qualified by specifying the option 1114 to select only those Direct Reports that are included in the group specified in input field 1116. For example, if the user entered "Employees in Europe" in the input field 1116 and specified option 1114, then the second group of users would be defined as the direct reports that work in Europe.

Figure 11D:
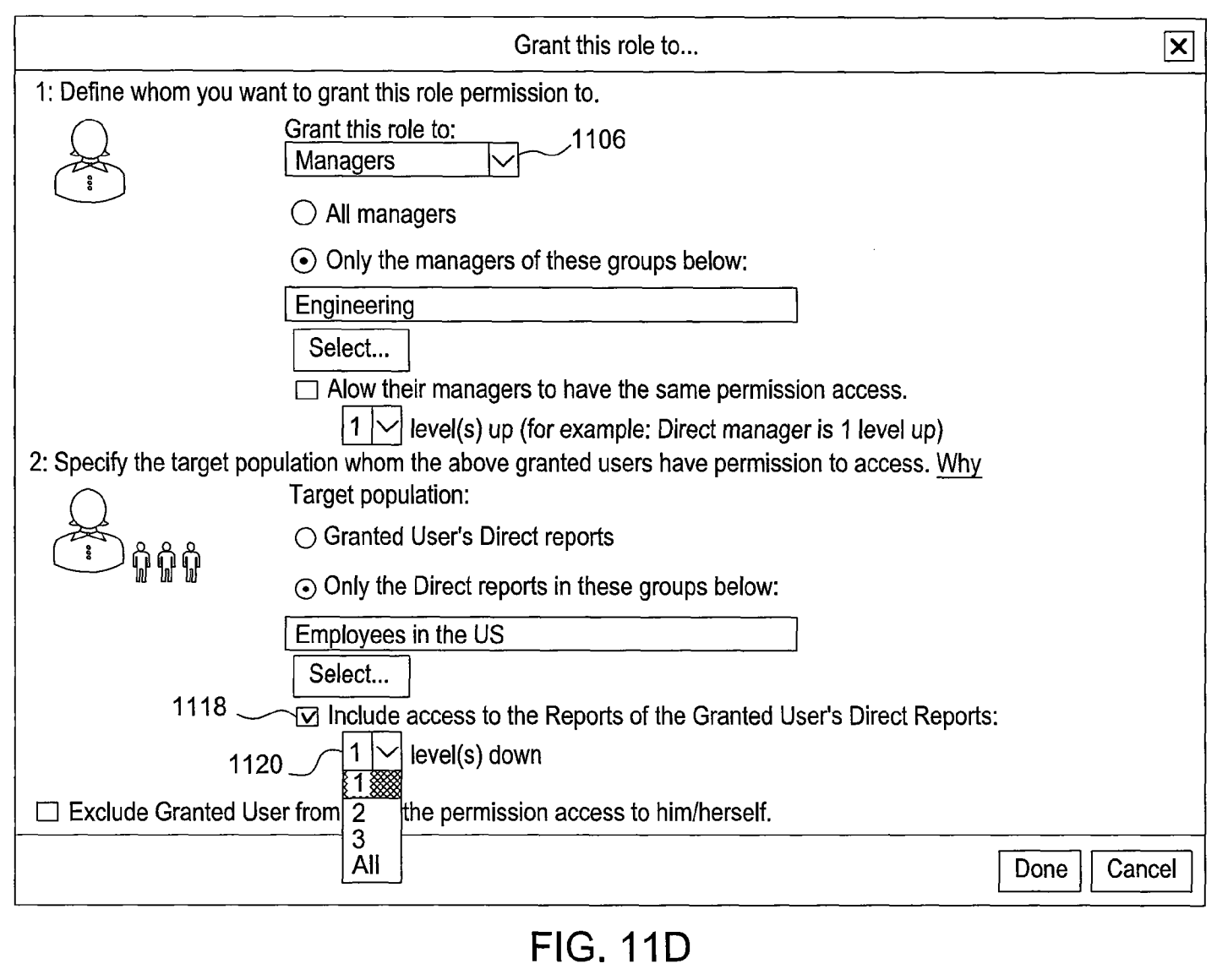

FIG. 11D is a screenshot of a user interface for specify a hierarchical depth of the second groups of users, according to one embodiment of the invention. As shown, checkbox 1118, labeled "Include access to the Reports of the Granted User's Direct Reports" is selected. The checkbox 1118 is associated with a drop-down menu 1120, labeled "level(s) down." Using the drop-down menu 1120, a user can specify how deep to go in the employee hierarchy to select the users to be included in the second group of users. The options may include 1, 2, 3, or all levels of the hierarchy. In other embodiments, any number of levels can be specified.

FIG. 11E is a screenshot of a user interface for specify a hierarchical depth of the second groups of users associated with a relationship, according to one embodiment of the invention. In some embodiments, other options in the drop-down list 1106, described in greater detail above in FIG. 11B, including matrix managers, HR managers, and custom managers, are referred to as "relationships." The "relationships" differ from "Managers" or "Second Managers" in terms of whether they are hierarchical or not. Only Manager and Second Manager options are hierarchical, which means that the users are selected based on a hierarchical tree structure that does not have circular loops. Therefore, a pathway through the hierarchical tree always ends in a leaf node.

In some embodiments, the other relationships, such as HR managers, matrix managers, and custom managers, are not hierarchical. Some embodiments allow "depth" to be specified for the second group of users when the first group of users is associated with a non-hierarchical relationship, such as HR managers, matrix managers, and custom managers. As shown in FIG. 11E, "Matrix Managers" is selected in the drop-down menu 1106. Accordingly, for the selection of the second group of users, an option 1122 sets the second group of users as the "Granted User's Matrix Reports," and an option 1124 sets the second group of users as only those matrix reports included in the groups specified in the input field 1126. In addition, in some embodiments, the user can specify the number of levels down in the employee hierarchy to include in the second group of users. In one embodiment, any depth specified for the second group starts with the first level at the non-hierarchical relationship (e.g., Matrix Reports), and then allows deeper levels that skip over to the direct reports (known as the manager or employee hierarchy) if more than one level deep is desired.

FIG. 11F is a screenshot of a user interface for qualifying the second group of users based on an attribute of users in the first group of users, according to one embodiment of the invention. For example, a user can specify that the users in the first group of users should have permission to perform the role onto anyone in their department. This means that if the first group of users includes the users that are in the engineering department, then a user in the engineering department has permission to perform the role onto everyone in the engineering department. This feature is shown in FIG. 11F, where a radio button 1128 is selected with the label "Target population of:", and the drop-down menu 1130 is shown with a selection of "Granted User's Department." In addition, a user can set custom fields, as shown in FIG. 11F by the "Granter User's custom01" and "Granter User's custom02."

In sum, embodiments of the invention provide a technique for creating dynamic groups of users and defining roles between groups of users. Large enterprises, such as large corporate entities, desire to have access to create many different permission roles, with more automation. Embodiments of the invention provide a framework in which these features can be realized.

Advantageously, embodiments of the invention provide significant enhancements to ease administrative burdens of large enterprises. The disclosed framework provides administrative efficiency, satisfies complex security control models, and handles security requirements of large enterprises and conglomerates.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for setting permissions for a first group of users of a computer system, the method comprising:
   receiving data through a first user interface to define a first group of users, wherein the data that defines the first group of users comprises a first group membership criterion, wherein a first user is dynamically added to the first group of users when an attribute associated with the first user satisfies the first group membership criterion and when a lock feature is not enabled, and wherein the first user is not added to the first group of users when the attribute associated with the first user satisfies the first group membership criterion and when the lock feature is enabled;
   receiving data through the first user interface to define a second group of users, wherein the first user interface associates a first name with the first group of users and the first user interface associates a second name with the second group of users;
   receiving data through a second user interface to define a role, the second user interface configured to display a plurality of categories of action-oriented permissions to a user, the action-oriented permissions each defining permitted functional actions, wherein the user selects one or more particular action-oriented permissions in one or more categories of permissions to define permitted functional actions for the role;
   assigning the defined role to the defined first group of users;
   specifying the defined second group of users as the target users of the role; and
   setting, by operation of a computer processor, the one or more particular action-oriented permissions based on the defined role to define permitted functional actions the first group of users can perform on information associated with the second group of users.

2. The method of claim 1, wherein the permitted functional actions comprise performing actions that are associated with the users in the second group of users.

3. The method of claim 1, wherein the first group of users comprise employees of a corporation.

4. The method of claim 1, wherein the data that defines the first group of users further comprises information associated with the first user and information associated with at least one user that is related to the first user in a non-hierarchical manner.

5. The method of claim 1, wherein the data that defines the first group of users further comprises a second group membership criterion, wherein the first user is included in the first group of users when one or more attributes associated with the first user satisfy the first group membership criterion but not the second group membership criterion, and a second user is included in the second group of users when one or more attributes associated with the second user satisfy the second group membership criterion but not the first group membership criterion.

6. The method of claim 1 wherein specifying the defined second group of users as the target users of the role comprises specifying a hierarchical depth that indicates a depth in an employee hierarchy for including users in the second group of users.

7. The method of claim 1 wherein specifying the defined second group of users as the target users of the role comprises specifying a non-hierarchical depth that indicates a depth in a non-hierarchical employee relationship for including users in the second group of users.

8. The method of claim 1 wherein the first user interface excludes multiple user-selected categories of users to define one or more of the first group of users and the second group of users.

9. The method of claim 1 wherein the plurality of categories of users comprise a team view to include one or more users in a team-based relationship in one or more of the first group of users and the second group of users.

10. A non-transitory computer-readable storage medium storing instructions that, when executed by a processor, cause a computing device to set permissions for a first group of users, by performing the steps of:
   receiving data through a first user interface to define a first group of users, wherein the data that defines the first group of users comprises a first group membership criterion, wherein a first user is dynamically added to the first group of users when an attribute associated with the first user satisfies the first group membership criterion and when a lock feature is not enabled, and wherein the first user is not added to the first group of users when the attribute associated with the first user satisfies the first group membership criterion and when the lock feature is enabled;
   receiving data through the first user interface to define a second group of users, wherein the first user interface associates a first name with the first group of users and the first user interface associates a second name with the second group of users;
   receiving data through a second user interface to define a role, the second user interface configured to display a plurality of categories of action-oriented permissions to a user, the action-oriented permissions each defining permitted actions, wherein the user selects one or more particular action-oriented permissions in one or more categories of permissions to define permitted functional actions for the role;

assigning the defined role to the defined first group of users;

specifying the defined second group of users as the target users of the role; and setting the one or more particular action-oriented permissions based on the defined role to define permitted functional actions the first group of users can perform on information associated with the second group of users.

11. The non-transitory computer-readable storage medium of claim 10, wherein the permitted functional actions comprise performing actions that are associated with the users in the second group of users.

12. The non-transitory computer-readable storage medium of claim 10, wherein the first group of users comprise employees of a corporation.

13. The non-transitory computer-readable storage medium of claim 10, wherein the data that defines the first group of users further comprises information associated with the first user and information associated with at least one user that is related to the first user in a non-hierarchical manner.

14. The non-transitory computer-readable storage medium of claim 10, wherein the data that defines the first group of users further comprises a second group membership criterion, wherein the first user is included in the first group of users when one or more attributes associated with the first user satisfy the first group membership criterion but not the second group membership criterion, and a second user is included in the second group of users when one or more attributes associated with the second user satisfy the second group membership criterion but not the first group membership criterion.

15. The non-transitory computer-readable storage medium of claim 10 wherein specifying the defined second group of users as the target users of the role comprises specifying a hierarchical depth that indicates a depth in an employee hierarchy for including users in the second group of users.

16. The non-transitory computer-readable storage medium of claim 10 wherein specifying the defined second group of users as the target users of the role comprises specifying a non-hierarchical depth that indicates a depth in a non-hierarchical employee relationship for including users in the second group of users.

17. The non-transitory computer-readable storage medium of claim 10 wherein the first user interface excludes multiple user-selected categories of users to define one or more of the first group of users and the second group of users.

18. The non-transitory computer-readable storage medium of claim 10 wherein the plurality of categories of users comprise a team view to include one or more users in a team-based relationship in one or more of the first group of users and the second group of users.

19. A computer system comprising:
a processor; and
a memory storing instructions that when executed by the processor cause the computer system to set permissions for a first group of users, by performing the steps of:
receiving data through a first user interface to define a first group of users, wherein the data that defines the first group of users comprises a first group membership criterion, wherein a first user is dynamically added to the first group of users when an attribute associated with the first user satisfies the first group membership criterion and when a lock feature is not enabled, and wherein the first user is not added to the first group of users when the attribute associated with the first user satisfies the first group membership criterion and when the lock feature is enabled;
receiving data through the first user interface to define a second group of users, wherein the first user interface associates a first name with the first group of users and the first user interface associates a second name with the second group of users;
receiving data through a second user interface to define a role, the second user interface configured to display a plurality of categories of action-oriented permissions to a user, the action-oriented permissions each defining permitted functional actions, wherein the user selects one or more particular action-oriented permissions in one or more categories of permissions to define permitted functional actions for the role;
assigning the defined role to the defined first group of users;
specifying the defined second group of users as the target users of the role; and
setting the one or more particular action-oriented permissions based on the defined role to define permitted functional actions the first group of users can perform on information associated with the second group of users.

20. The computer system of claim 19, wherein the permitted functional actions comprise performing actions that are associated with the users in the second group of users.

21. The computer system of claim 19, wherein the first group of users comprise employees of a corporation.

22. The computer system of claim 19, wherein the data that defines the first group of users further comprises information associated with the first user and information associated with at least one user that is related to the first user in a non-hierarchical manner.

23. The computer system of claim 19, wherein the data that defines the first group of users further comprises a second group membership criterion, wherein the first user is included in the first group of users when one or more attributes associated with the first user satisfy the first group membership criterion but not the second group membership criterion, and a second user is included in the second group of users when one or more attributes associated with the second user satisfy the second group membership criterion but not the first group membership criterion.

* * * * *